United States Patent
Ryu et al.

(10) Patent No.: US 8,787,232 B2
(45) Date of Patent: Jul. 22, 2014

(54) METHOD AND APPARATUS FOR UPDATING EXTENDED ACCESS BARRING INFORMATION

(71) Applicant: LG Electronics Inc., Seoul (KR)

(72) Inventors: Ki Seon Ryu, San Diego, CA (US); Sang Gook Kim, San Diego, CA (US); Ki Dong Lee, San Diego, CA (US)

(73) Assignee: LG Electronics Inc., Seoul (KR)

( * ) Notice: Subject to any disclaimer, the term of this patent is extended or adjusted under 35 U.S.C. 154(b) by 96 days.

(21) Appl. No.: 13/660,822

(22) Filed: Oct. 25, 2012

(65) Prior Publication Data

US 2013/0107778 A1 May 2, 2013

Related U.S. Application Data (60) Provisional application No. 61/551,897, filed on Oct. 26, 2011.

(30) Foreign Application Priority Data

Oct. 25, 2012 (WO) ................ PCT/KR2012/008793

(51) Int. Cl.
- *G08C 17/00* (2006.01)
- *H04W 4/00* (2009.01)
- *H04W 48/02* (2009.01)
- *H04W 74/08* (2009.01)
- *H04W 76/02* (2009.01)

(52) U.S. Cl.
CPC ............ *H04W 4/005* (2013.01); *H04W 48/02* (2013.01); *H04W 74/0875* (2013.01); *H04W 76/02* (2013.01)
USPC ......... 370/311; 370/329; 455/404.1; 455/411

(58) Field of Classification Search
None
See application file for complete search history.

(56) References Cited

U.S. PATENT DOCUMENTS

| | | | |
|---|---|---|---|
| 2011/0170503 A1* | 7/2011 | Chun et al. | 370/329 |
| 2013/0040597 A1* | 2/2013 | Jang et al. | 455/404.1 |
| 2013/0040605 A1* | 2/2013 | Zhang et al. | 455/411 |
| 2013/0044702 A1* | 2/2013 | Jayaraman et al. | 370/329 |

OTHER PUBLICATIONS

Itri, "Discussion on EAB information update and acquisition," 3GPP TSG-RAN WG2 #75bis, R2-115284, pp. 1-4, Oct. 10-14, 2011.
LG Electronics Inc., "PWS-like Broadcast for MTC," 3GPP TSG-RAN WG2 #71, R2-104561, pp. 1-2, Aug. 23-28, 2010.
Zte, "Update of EAB parameters," 3GPP TSG RAN WG2 #75bis, R2-114957, pp. 1-4, Oct. 10-14, 2011.

* cited by examiner

*Primary Examiner* — Ian N Moore
*Assistant Examiner* — Brian T Le
(74) *Attorney, Agent, or Firm* — Birch, Stewart, Kolasch & Birch, LLP (57) ABSTRACT

A method and apparatus for extended access barring (EAB) in a wireless communication system. In detail, the present description proposes a DRX cycle threshold, which is used to determine specific mechanism of EAB information update and acquisition. In detail, the present description proposes a method in which a first EAB information update/acquisition scheme is applied when a DRX cycle for a certain UE is greater (i.e., longer) than the DRX cycle threshold and a second EAB information update/acquisition scheme is applied when the DRX cycle is not greater than the DRX cycle threshold.

14 Claims, 7 Drawing Sheets

METHOD AND APPARATUS FOR UPDATING EXTENDED ACCESS BARRING INFORMATION

CROSS-REFERENCE TO RELATED APPLICATIONS

The present application for patent claims priority to Provisional Application No. 61/551,897 filed on Oct. 26, 2011, and International Application No. PCT/KR2012/008793 filed on Oct. 25, 2012, which are incorporated herein by reference.

BACKGROUND OF THE INVENTION

1. Field of the Invention

The technical features of this document relate to machine type communication (MTC) in wireless communications using a number of orthogonal frequency division multiple (OFDM) symbols, and more particularly, to a method and apparatus for performing random access procedure with extended access barring.

2. Related Art

The Third Generation Partnership Project (3GPP) Long Term Evolution (LTE) which is a set of enhancements to the Universal Mobile Telecommunications System (UMTS) is introduced as 3GPP Release 8. The 3GPP LTE uses orthogonal frequency division multiple access (OFDMA) for a downlink, and uses single carrier frequency division multiple access (SC-FDMA) for an uplink, and adopts multiple input multiple output (MIMO) with up to four antennas. In recent years, there is an ongoing discussion on 3GPP LTE-Advanced (LTE-A), which is a major enhancement to the 3GPP LTE.

Machine to machine (M2M) communication or machine-type communication (MTC) is the communication between machines that do not necessarily need human intervention. The 3GPP has started an effort to determine potential network optimizations that could lower the operational costs associated with offering these new M2M services.

SUMMARY OF THE INVENTION

A method and apparatus receiving data associated with extended access barring (EAB) in a wireless communication system are provided. The method is performed by an MTC device which can be a terminal having MTC features.

In one aspect, the method comprises receiving DRX information on a DRX cycle and a DRX offset from a base station (BS); performing a DRX operation based on the DRX information; determining whether the DRX cycle indicated by the DRX information is greater than a DRX cyclic threshold, wherein the DRX cyclic threshold is included in control information received from the BS; if the DRX cycle is greater than the DRX cyclic threshold, receiving a first system information block (SIB) to determine whether the EAB information has been changed and further receiving a second SIB to obtain changed EAB information when the first SIB indicates the EAB information has been changed; if the DRX cycle is not greater than the DRX cyclic threshold, receiving a paging message from the BS to determine whether the EAB information has been changed and further receiving the second SIB to obtain changed EAB information when the paging message indicates the EAB information has been changed; and performing an EAB operation based on the changed EAB information In another aspect, the method includes receiving DRX information on a DRX cycle and a DRX offset from a base station (BS); performing a DRX operation based on the DRX information; determining whether the DRX cycle indicated by the DRX information is greater than a DRX cyclic threshold, wherein the DRX cyclic threshold is included in control information received from the BS; if the DRX cycle is greater than the DRX cyclic threshold, receiving a system information block (SIB) including the EAB information; if the DRX cycle is not greater than the DRX cyclic threshold, receiving a paging message from the BS to determine whether the EAB information has been changed and further receiving the SIB to obtain changed EAB information when the paging message indicates the EAB information has been changed; and performing an EAB operation based on the changed EAB information

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. The UTRA is a part of a universal mobile telecommunication system (UMTS). The $3^{rd}$ generation partnership project (3GPP) long term evolution (LTE) is a part of an evolved UMTS (E-UMTS) using the E-UTRA. The 3GPP LTE uses the OFDMA in the downlink and uses the SC-FDMA in the uplink.

For clarity of explanation, the following description will focus on the 3GPP LIE and its evolution. However, the technical features of this description are not limited thereto.

Figure 1:
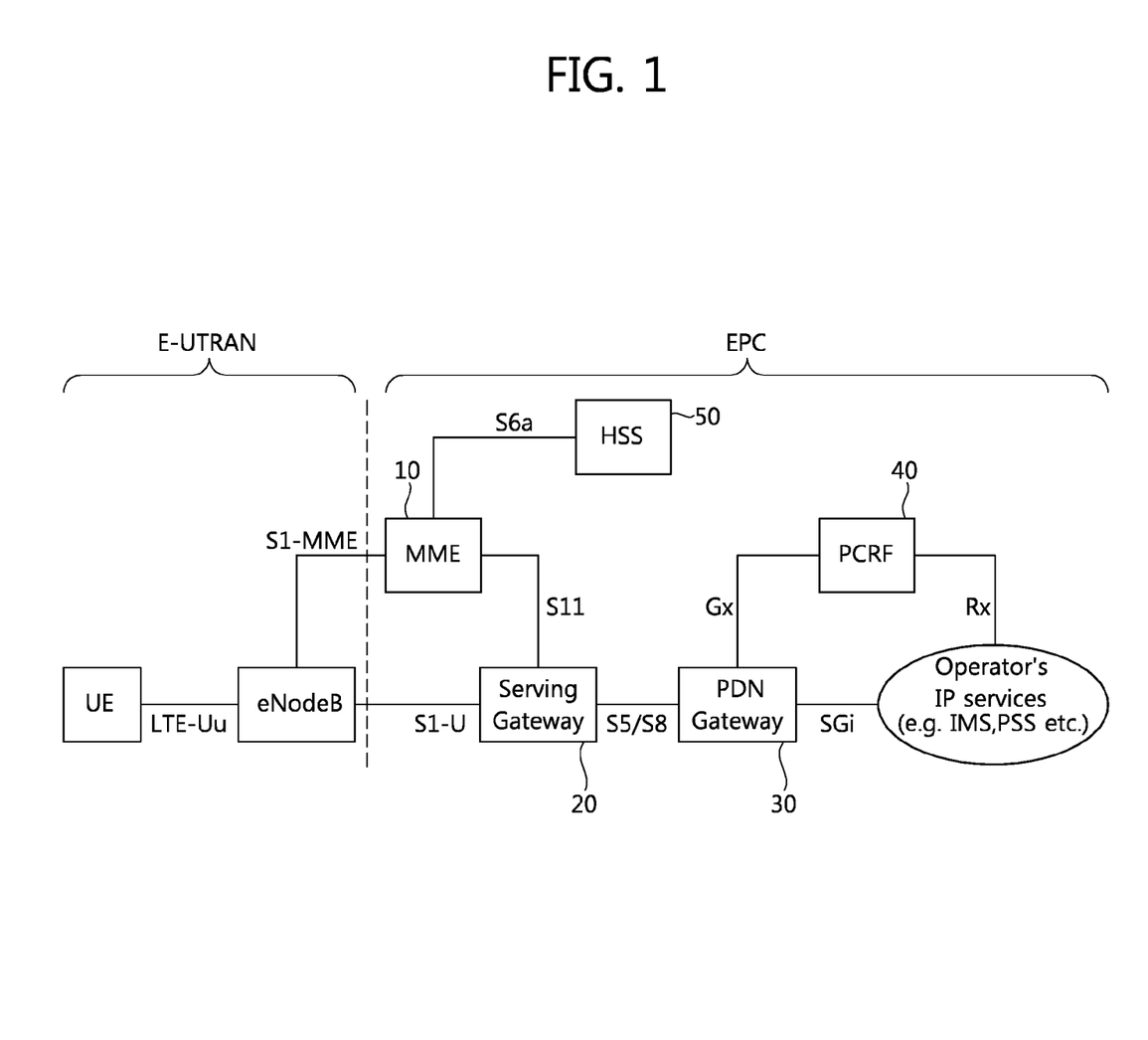
FIG. 1 is a view illustrating an Evolved Packet System which is associated with the Long Term Evolution (LTE) system.

FIG. 1 is a view illustrating an Evolved Packet System which is associated with the Long Term Evolution (LTE) system. The LTE system aims to provide seamless Internet Protocol (IP) connectivity between a user equipment (UE) and a pack data network (PDN), without any disruption to the end user's application during mobility. While the LTE system encompasses the evolution of the radio access through an E-UTRAN (Evolved Universal Terrestrial Radio Access Network) which defines a radio protocol architecture between a user equipment and a base station, it is accompanied by an evolution of the non-radio aspects under the term 'System Architecture Evolution' (SAE) which includes an Evolved Packet Core (EPC) network. The LTE and SAE comprise the Evolved Packet System (EPS).

The EPS uses the concept of 'EPS bearers' to route IP traffic from a gateway in the PDN to the UE. A bearer is an IP packet flow with a specific Quality of Service (QoS) between the gateway and the UE. The E-UTRAN and EPC together set up and release the bearers as required by applications.

The EPC, which is also referred to as the core network (CN), controls the UE and manages establishment of the bearers. As depicted in FIG. 1, the node (logical or physical) of the EPC in the SAE includes a Mobility Management Entity (MME) 10, a PDN gateway (PDN-GW or P-GW) 30, a Serving Gateway (S-GW) 20, a Policy and Charging Rules Function (PCRF) 40, a Home subscriber Server (HSS) 50, etc.

The MME 10 is the control node which processes the signaling between the UE and the CN. The protocols running between the UE and the CN are known as the Non-Access Stratum (NAS) protocols. Examples of functions supported by the MME 10 includes functions related to bearer management, which includes the establishment, maintenance and release of the bearers and is handled by the session management layer in the NAS protocol, and functions related to connection management, which includes the establishment of the connection and security between the network and UE, and is handled by the connection or mobility management layer in the NAS protocol layer.

The S-GW 20 serves as the local mobility anchor for the data bearers when the UE moves between eNodeBs. All user IP packets are transferred through the S-GW 20. The S-GW 20 also retains information about the bearers when the UE is in idle state (known as ECM-IDLE) and temporarily buffers downlink data while the MME initiates paging of the UE to re-establish the bearers. Further, it also serves as the mobility anchor for inter-working with other 3GPP technologies such as GPRS (General Packet Radio Service) and UMTS (Universal Mobile Telecommunications System).

The P-GW 30 serves to perform IP address allocation for the UE, as well as QoS enforcement and flow-based charging according to rules from the PCRF 40. The P-GW 30 performs QoS enforcement for Guaranteed Bit Rate (GBR) bearers. It also serves as the mobility anchor for inter-working with non-3GPP technologies such as CDMA2000 and WiMAX networks.

The PCRF 40 serves to perform policy control decision-making, as well as for controlling the flow-based charging functionalities.

The HSS 50, which is also referred to as a Home Location Register (HLR), contains users' SAE subscription data such as the EPS-subscribed QoS profile and any access restrictions for roaming. Further, it also holds information about the PDNs to which the user can connect. This can be in the form of an Access Point Name (APN), which is a label according to DNS (Domain Name system) naming conventions describing the access point to the PDN, or a PDN Address which indicates subscribed IP addresses.

Between the EPS network elements shown in FIG. 1, various interfaces such as an S1-U, S1-MME, S5/S8, S11, S6a, Gx, Rx and SGi are defined.

Figure 2:
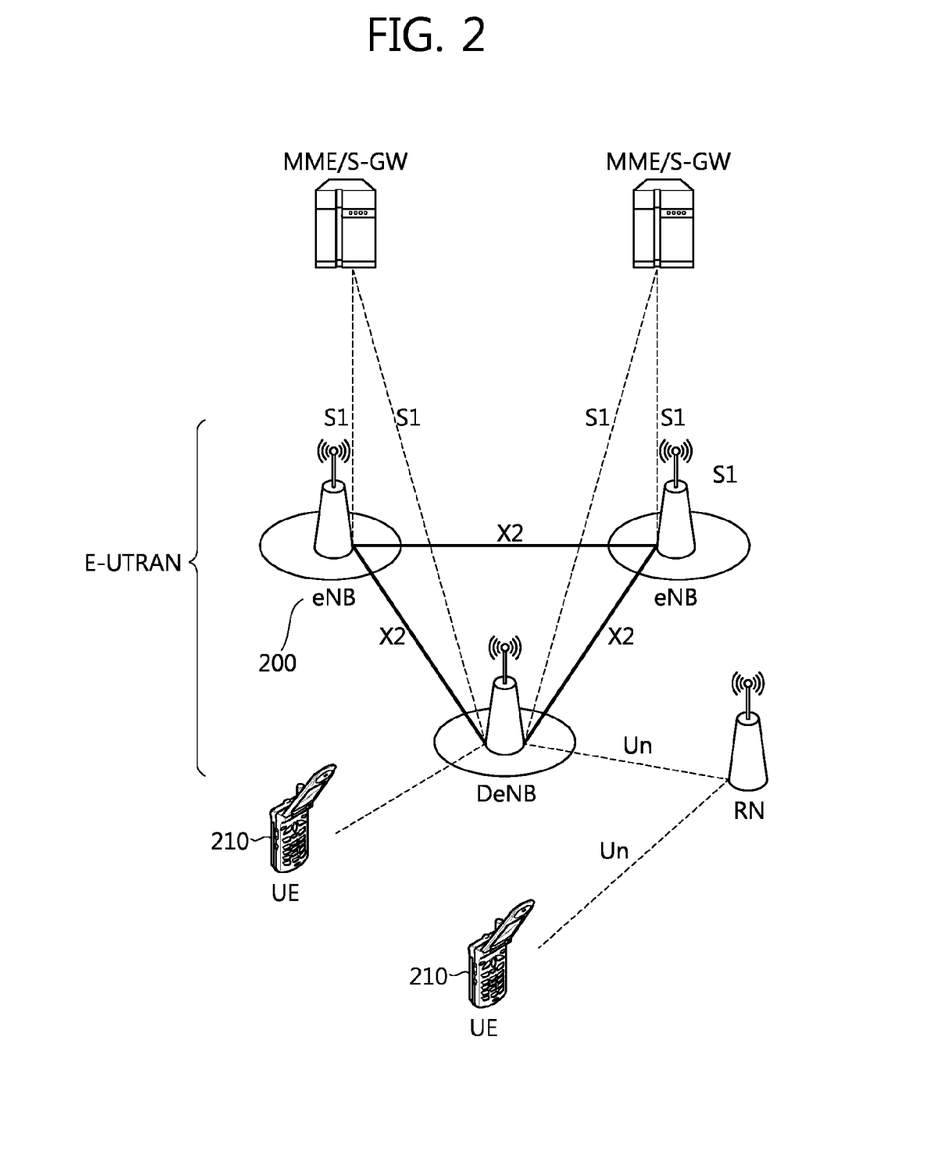
FIG. 2 is a view illustrating an overall architecture of the E-UTRAN to which the following technical features are applied.

FIG. 2 is a view illustrating an overall architecture of the E-UTRAN to which the following technical features are applied.

The E-UTRAN includes at least one eNB (evolved-Node B) 200 providing a user plane and a control plane towards a user equipment (UE) 210. The UE can be fixed or mobile and can be referred to as another terminology, such as a MS (Mobile Station), a UT (User Terminal), an SS (Subscriber Station), an MT (mobile terminal), a wireless device, or the like. The eNB 200 may be a fixed station that communicates with the UE 100 and can be referred to as another terminology, such as a base station (BS), a NB (NodeB), a BTS (Base Transceiver System), an access point, or the like.

The protocols running between the eNBs 200 and the UE 210 are known as the Access Stratum (AS) protocols.

The BSs (or eNBs) 200 are interconnected with each other by means of an X2 interface. The BSs 200 are also connected by means of the S1 interface to the aforementioned EPC (Evolved Packet Core) elements, more specifically to the Mobility Management Entity (MME) by means of the S1-MME and to the Serving Gateway (S-GW) by means of the S1-U.

Further, the E-UTRAN can additionally provide relay functionality. The E-UTRAN can include a Donor eNB (DeNB) that provides at least one Relay Node (RN), with access to the core network. Between the DeNB and RN, an Un interface is defined, whereas an Uu interface is further defined between the RN and the UE.

Here, features related to machine-type communication (MTC) are further explained. As discussed above, MTC is the communication between machines that do not necessarily need human intervention, and the 3GPP has started an effort to determine potential network optimizations. The MTC, which is also referred to as machine-to-machine (M2M), is expected to have applications in areas, such as smart metering, home automation, e-Health, fleet management, etc. In 3GPP LIE, the support of MTC (or M2M) nodes, or interchangeably delay-tolerant access or low priority access, requires very efficient operating mechanisms and protocols for the traffic channel and random access channel.

MTC has a number of unique characteristics which may be used to optimize the usage of the operator network. These characteristics include, for example: mostly data-centric communication (voice not expected), a potentially large number of communicating terminals, a low traffic volume per terminal, a potentially low mobility for some devices, and potentially power-limited devices.

Hereinafter, random access procedure is explained. The random access procedure can be initiated with an Access Class (AC) barring, which is also referred to as AC barring, or ACB. Further, AC barring applied to LTE system can be referred to as LTE ACB, or Rel-10 ACB. In 3GPP, each UE belongs to an AC in the range 0-9. In addition, some UEs may belong to one or more high priority ACs in the range 11-15, which are reserved for specific uses, e.g., security services, public utilities, PLMN staff, etc. AC 10 is used for emergency access.

The UE checks if access is barred for all its applicable ACs, and relevant control information is transmitted via SystemInformationBlockType2 (SIB2). SIB2 may include a set of AC barring parameter for Mobile Originated (MO) calls and/or MO signaling. This set of parameters comprises a probability factor and a barring time for ACs 0-9 and a list of barring bits for ACs 11-15. For ACs 0-9, if the UE initiates an MO call and the relevant parameters are included, the UE draws a random number. If the drawn number exceeds the probability factor, access is not barred. Otherwise access is barred for a duration which is randomly selected based on the broadcasted barring time value. For ACs 11-15, if the UE initiates an MO call and the relevant AC barring parameters are included, access is barred whenever the bit corresponding to all of the UE's AC is set. The behavior is similar in the case of UE-initiated MO signaling.

Figure 3:
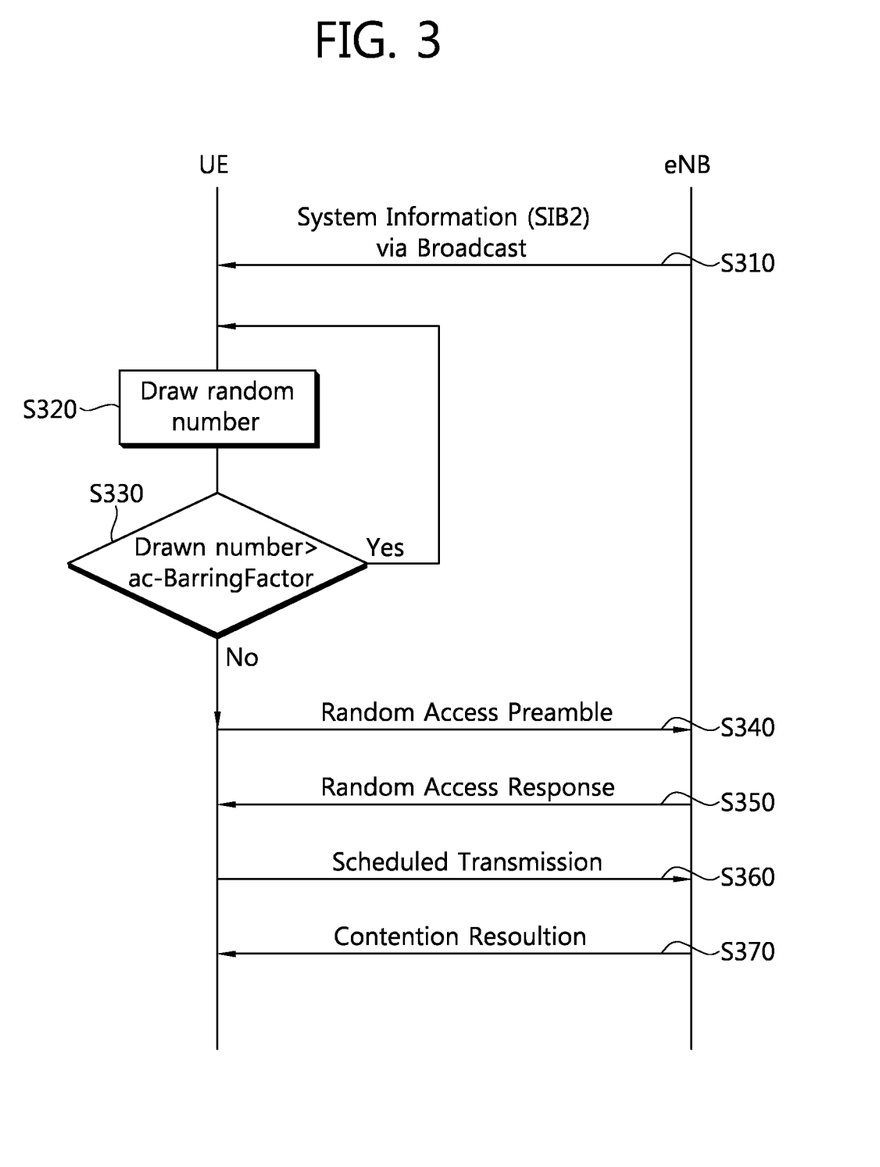
FIG. 3 is a flow diagram showing a random access procedure which is used for an embodiment of the proposed method.

FIG. 3 is a flow diagram showing a random access procedure which is enhanced by an embodiment of the proposed mechanism.

In order to obtain new connection (e.g., a data connection or signaling connection) UEs first performs a RA procedure and this is a common feature in most cellular system. Further, the RA procedure can be categorized into contention-based and contention-free. The example depicted in FIG. 3 is directed to the contention-based RA procedure.

In step S310, the relevant parameters are transmitted from a base station (e.g., eNB). Various control information can be broadcasted via 'System information', such as Master Information Block (MIB) and System Information Block type k (k=1, 2, . . . ), and the relevant parameters associated with the AC barring are broadcasted via SIB2, as discussed above. As explained above, SIB2 provides information for UEs how they perform the RA procedure. The SIB2 further includes a value for 'ac-BarringFactor', which indicates the probability that a certain UE is supposed to be prevented from attempting the RA procedure to a certain cell. In case of an ordinary call (i.e., MO data call), in step S320, the UE shall draw a random number from a uniform distribution (0,1). If the random number drawn is less than the 'ac-BarringFactor', the UE performs subsequent steps of the RA procedure (S330).

In step S340, a UE selects a particular random access preamble and certain Random Access Channel (RACH) resources from an available random access preamble set and RACH resources, and transmits the selected random access preamble on the selected RACH to an eNB.

In step S350, the eNB receives the random access preamble, and then transmits a random access response to the UE. Further, the random access response includes a time advance (TA) and uplink radio resource allocation information for the transfer of a scheduled message, and also includes an index of the received random access response so that the UE can determine whether the random access response is for the UE. The random access response transmitted on a DL-SCH (downlink-shared channel) may be specified by a DL L1/L2 (downlink layer 1/layer 2) control channel indicated by a random access-radio network temporary identity (RA-RNTI).

In step S360, the UE receives the random access response, and then transmits the scheduled message according to radio resource allocation information included in the random access response. The scheduled message, which is also referred to as a 'Message 3', may include a radio resource control (RRC) connection request message.

In step S370, the BS receives the scheduled message from the UE, and then transmits a contention resolution message, which is also referred to as a Message 4, to the UE. In order to check whether contention occurs with respect to the Message 3, a contention resolution timer is initiated after transmitting the Message 3. If the Message 4 is not successfully received until the contention resolution timer expires, step 370 may be repeated based on predefined configuration.

After the RRC connection request message (S360) is received by the network, an RRC connection can be successfully established and the UE enters an RRC connected mode. However, the RRC connection request may be rejected, and the UE may thereafter receive an 'RRCConnectionReject' message from the eNB. Further, the UE may consider that the RRC connection requested is regarded as rejected without explicitly receiving the 'RRCConnectionReject' when the contention resolution timer expires without receiving the Message 4. In these cases, a certain delay, which is referred to as 'wait time' in 3GPP context, can be applied before performing the AC barring to avoid the large number of UE-initiated call attempts. In particular, the UE is required to avoid a subsequent AC barring during the wait time, which is indicated by the network. In the standard, a range of the wait time is set to [1, 16 (sec)]. In addition, if an 'RRCConnectionRelease' message is received by a UE, the wait time is also applied before performing the AC barring. The RRCConnectionRelease message is received when the RRC Connection is released after the RRC connection is successfully established.

Recently, 3GPP has newly introduced an 'extendedWaitTime', which is an extended version of the above-mentioned wait time. Accordingly, the extended wait time is applicable to a case where a request for RRC connection is regarded as rejected or an RRC connection is released. Meanwhile, the extended wait time can be additionally used with the wait time. Namely, for a certain UE, both the wait time and the extended wait time can be applied.

A range of the extended wait time was originally set to [1, 4096 (sec)], but recently changed to [1, 1800 (sec)]. An exact time value of the extended wait time can be contained in the 'RRCConnectionReject' or 'RRCConnectionRelease' message. Once the extended wait time is contained, the UE reports to the upper layer (i.e., NAS layer), sets the timer value as the received 'extendedWaitTime', and starts the timer of the extended wait time. While the timer is running, the UE is not allowed to attempt an RRC connection request. The use of 'extendedWaitTime' is to prevent the UE (released or rejected) from attempting 'RRCConnectionRequest' for a longer period of time than the wait time. The concept of the extended wait time is highly associated with the afore-mentioned M2M communications, delay tolerant accesses, and/or lower priority accesses. Namely, it is preferred that the extended wait time should be applied to a UE, which has M2M, delay tolerant, and/or lower priority characteristics. For instance, if the UE is identified as an M2M (or MTC) devices, and/or a cause code in RRC messages (e.g., RRC connection request/release messages) is identified as 'delay tolerant' or 'lower priority', the extended wait time is applicable. Meanwhile, it is noted that even H2H devices (e.g., human UEs), as opposed to M2M devices, can have the delay tolerant or lower priority characteristics, when a certain connection or an application in the H2H devices has such characteristics.

The present description is related to extended access barring (EAB), which is applicable to UEs supporting delay tolerant (e.g., MTC, M2M, lower priority) services. In other words, the present description can be beneficial to a UE configured for EAB. The UE configured for/with EAB implies a UE which supports delay-tolerant access and/or low priority access. Any MTC or M2M nodes can be the UE configured for/with EAB.

Detailed features and requirements of EAB are disclosed in 3GPP TS 22.011 V11.0.0. The EAB which is applicable to delay tolerant services is corresponding to the aforementioned Access Class (AC) barring procedure which is applicable to conventional human to human (H2H) communication. The EAB can be performed together with or instead of the conventional AC barring (i.e., legacy AC barring). In other word, an EAB operation can be performed together with or instead of LTE ACB, or Rel-10 ACB.

Based on 3GPP standards, the following requirements are considered:

EAB is a mechanism for the operator(s) to control Mobile Originating (MO) access attempts from UEs that are configured for EAB in order to prevent overload of the access network and/or the core network.

In congestion situations, the operator can restrict access from UEs configured for EAB while permitting access from other UEs.

UEs configured for EAB are considered more tolerant to access restrictions than other UEs.

When an operator determines that it is appropriate to apply EAB, the network broadcasts necessary information to provide EAB control for UEs in a specific area.

Further, the following requirements are also applied:

The UE is configured for EAB by the Home PLMN (HPLMN).

EAB shall be applicable to all 3GPP Radio Access Technologies.

EAB shall be applicable regardless of whether the UE is in a Home or a Visited PLMN.

Relevant information to enable the UE to perform EAB should be provided to the UE. In this description, such information is referred to as 'EAB information'. The EAB information should include the following information:

The EAB information shall define whether EAB applies to UEs within one of the following categories: a) UEs that are configured for EAB; b) UEs that are configured for EAB and are neither in their HPLMN nor in a PLMN that is equivalent to it; c) UEs that are configured for EAB and are neither in the PLMN listed as most preferred PLMN of the country where the UE is roaming in the operator-defined PLMN selector list on the SIM/USIM, nor in their HPLMN nor in a PLMN that is equivalent to their HPLMN.

Further, the EAB information shall also include extended barring information for Access Classes 0-9. For instance, various information can be included in the EAB information to restrict access UEs with various Access Classes. For instance, bitmap information in which respective bits represent whether a certain Access Class is barred can be included in the EAB information. In particular, 10-bit information each representing ACs 0-9 together with at least two bits representing a category of the UE can be included in the EAB information. Alternatively, a probability factor and a barring time for a certain Access Class can be included in the EAB information.

The UE configured for EAB shall use its allocated Access Class(es), as defined in sub-clause 4.2 of 3GPP TS 22.011 V11.0.0, when evaluating the EAB information that is broadcast by the network, in order to determine if its access to the network is barred.

When performing EAB, the following requirement also should be applied:

If the UE that is configured for EAB initiates an emergency call or is a member of an Access Class in the range 11-15 and according to clause 4.3.1 of 3GPP TS 22.011 V11.0.0 that Access Class is permitted by the network, then the UE shall ignore any EAB information that is broadcast by the network.

If the network is not broadcasting the EAB information, the UE shall be subject to access barring as described in clause 4.3.1 of 3GPP TS 22.011 V11.0.0.

If the EAB information that is broadcast by the network does not bar the UE, the UE shall be subject to access barring as described in clause 4.3.1 of 3GPP TS 22.011 V11.0.0.

In the case of multiple core networks sharing the same access network, the access network shall be able to apply the EAB for the different core networks individually.

It should be noted that the following agreements have been made for EAB information and operations related to EAB:

Somehow the UE knows whether at a certain radio resource control (RRC) connection establishment it needs to apply EAB or not.

Broadcast Control Channel (BCCH) broadcasts EAB information.

The EAB information on BCCH indicates which 'category' of UEs configured with EAB apply EAB.

UEs configured with EAB check their categories (i.e. category a, b, c) in order to decide whether or not to apply EAB.

If UE is establishing the RRC connection for emergency call, UE configured with EAB applies no EAB.

If UE has no special AC, UE configured with EAB applies EAB for non-emergency calls.

If the EAB information is not available on BCCH, UEs configured with EAB apply no EAB, but apply Rel-10 ACB.

While detailed features of EAB in 3GPP standards have not been finalized yet, following agreements are made for EAB information and operations related to EAB:

The UE associated with high priority access can ignore any EAB information. If a UE that is configured for EAB initiates an emergency call or is a member of an Access Class in the range 11-15, the UE shall ignore any EAB information that is broadcast by the network.

In the case of multiple core networks sharing the same access network, EAB information can be PLMN specific.

The contents of the EAB information can be configured based on the type of communication system. For UMTS system, the EAB information can be bitmap information in which 1 bit information is set for corresponding Access Class (AC). For instance, 10 bits can be used for ACs 0-9 to indicate whether respective ACs are barred or not. Alternatively, features of legacy ACB (e.g., probability factor and barring time) can be provided as the EAB information for LTE system.

Recently, a number of alternatives for EAB information update and acquisition have been proposed. Examples of proposed alternatives include:

Based on alternative A, a mechanism based on 'EAB in an existing SIB+existing update mechanism (paging or value tag for LTE)' can be used. In detail, the EAB information can be included in any conventional SIB, and an update indicator indicating whether such EAB information has been updated can be implemented as a value tag of a conventional paging message. Upon obtaining such value tag, a UE in idle mode wakes up (by terminating the idle mode) and obtains the updated EAB information in the conventional SIB. It should be noted that this mechanism has a technical problem in which the value tag of the conventional paging message can be set 'on' even when any information other than the EAB information has been updated. Thus, a UE following alternative A can wake up even when the EAB information has not been updated.

Based on alternative B, a mechanism based on 'EAB in a new SIB+existing update mechanism' can be used. In detail, the EAB information can be included in a new type of SIB, and an update indicator indicating whether such EAB information has been updated can be implemented as a value tag included in a conventional paging message or version information included in a conventional SIB type 1 (SIB 1). Alternative B has the same technical problem as alternative A.

Based on alternative C, a mechanism based on 'EAB in an existing SIB+UE is required to read corresponding SIB (or valueTag) prior to EAB-based access' can be used. In detail, the EAB information is included in any conventional SIB, and the UE is required to check another SIB (or value tag) prior to performing EAB. Based on this alternative, page is not required for EAB information update and acquisition.

Based on alternative D, a mechanism based on 'EAB in a new SIB+UE is required to read corresponding SIB (or check valueTag) prior to EAB-based access' can be used. Alternative D is similar to alternative C except the use of a new type of SIB.

For UEs which intend to access the network, Alternative D enables to receive the new SIB including the EAB information. This causes problems where access congestion level can be increased right after every EAB SIB transmission. Further, in case of surge event (e.g., emergency situation), access from a large number of MTC device configured with EAB can cause severe degradation to non-EAB configured UE's random access performance.

Based on alternative E, a mechanism based on 'EAB in a new SIB+Dedicated paging message for new SIB' can be used. In detail, the EAB information is included in a new type of SIB, and dedicate signaling (e.g., paging message) is further used to indicate whether the EAB information has been updated. Alternative E is similar to alternative D except the use of the paging message.

When applying to a UE associated with low priority and/or delay tolerant characteristics, alternative E has technical drawback where EAB change notification (i.e., an indicator indicating whether the EAB information has been updated) included in the paging message may not be up-to-dated when the UE attempts random access. In general, the UE associated with low priority and/or delay tolerant characteristics is allocated a long DRX (Discontinuous Reception) cycle. DRX functionality can be configured for the UE so that it does not always need to monitor a PDCCH. A DRX cycle consists of an 'On duration' during which the UE should monitor the PDCCH and a 'Off duration (or non-monitored duration)' during which the UE can skip reception of the PDCCH for battery saving purpose.

It is preferred that change of the EAB information should not be affected by SIB modification period (MP) and should not affect a value tag (i.e., systemInfoValueTag) included in SIB type 1. However, if the transmission period of SIB including the EAB information is too short compared to the DRX cycle, there should be some UEs which fail to receive the updated EAB change notification via the paging message, since such UEs do not have chances to decode the paging message due to the long DRX cycle. Eventually, UEs with different DRX cycles and different paging offsets may have different EAB change notifications (some of which are out-of-dated), because each UE receives EAB change notification included in paging at different time.

Based on alternative F, a mechanism based on 'EAB in random access response (RAR)' can be used. In detail, the EAB information is delivered to the UE through the random access response. Alternative F can cause problems where updated EAB information cannot be used to control access load for initial random access preamble transmission because EAB is not applicable to UE's first random access trial. Further, alternative F can cause problems of decoding the RAR before attempting random access, which increases UE's complexity.

To improve the performance of the above-explained alternatives (e.g., alternative e), the present description proposes a DRX cycle threshold, which is used to determine specific mechanism of EAB information update and acquisition. In detail, the present description proposes a method in which a first EAB information update/acquisition scheme is applied when a DRX cycle for a certain UE is greater (i.e., longer) than the DRX cycle threshold and a second EAB information update/acquisition scheme is applied when the DRX cycle is not greater than the DRX cycle threshold. The first EAB information update/acquisition scheme can be the above-explained alternative D, and the second EAB information update/acquisition scheme can be the above-explained alternative E.

Namely, the present description proposes to set the DRX cycle threshold for UEs to adopt one of the following schemes:

The first scheme: to perform EAB check before performing random access, the UE should receive the SIB including EAB information.

The second scheme: to perform EAB check before random access, the UE uses the information of EAB change indication in a paging message previously received.

Therefore, the UE configured with EAB has a longer DRX cycle than the DRX cycle threshold, the UE should receive a SIB (e.g., newly-designed SIB) including the EAB information. Otherwise, UE uses the information of EAB change indication in a paging message previously received to perform EAB check before random access.

Figure 4:
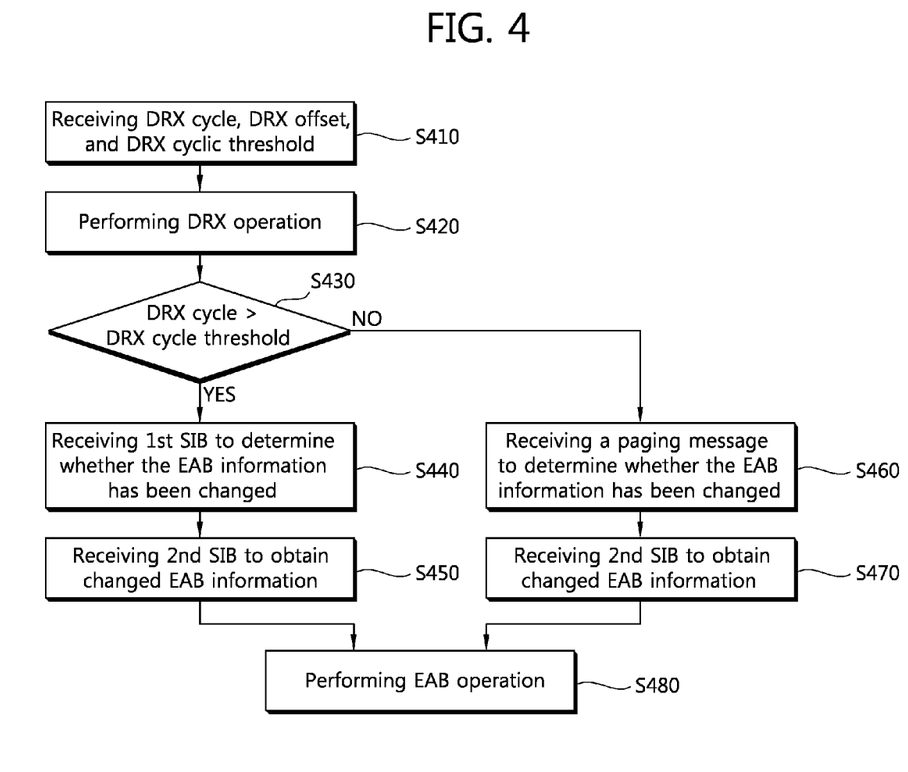
FIG. 4 is a flow diagram proposed by the present description.

FIG. 4 is a flow diagram proposed by the present description. The example of FIG. 4 uses the DRX cycle threshold to determine which EAB information update/acquisition scheme is applied. The example of FIG. 4 is applicable to UEs configured with EAB operation.

In S410, the UE configured with the EAB receives control information related to DRX operation. The control information may include information on a DRX cycle, a DRX offset, and a DRX cyclic threshold. The control information can be delivered to the UE in various ways. For instance, the DRX cycle and the DRX offset can be delivered together by the same message or signalling (e.g., RRC signalling), and the DRX cyclic threshold can be delivered separately from the DRX cycle and the DRX offset. The DRX cycle threshold can be signaled to the UE through RRC signalling or broadcasted system information. The DRX cycle and the DRX offset can be UE-specific information and be received from a base station. The DRX cyclic threshold can be cell-common information and be received from a base station. Alternatively, the DRX cyclic threshold can be pre-configured to the UE or fixed as a system parameter without signalling from a base station. It is also possible that DRX cycle threshold can be known only to the network entity such as eNB or MME. In this embodiment, through RRC signaling, UE can be just informed of whether it should receive SIB including EAB or it should use the information of EAB change indication in paging previously received to perform EAB check before random access.

In S420, each UE performs a DRX operation based on the received information. As discussed above, the DRX cycle includes an on-duration in which the UE monitors a physical control channel and an off-duration in which the UE stops monitoring the physical control channel.

Once the UE intends to wake up from the idle mode and to establish a connection with a network (e.g., base station), the UE is required to initiate random access procedure by performing the EAB operation. To perform the EAB operation properly, the UE is required to check whether the EAB information has been changed (updated) and received it if necessary.

The example of FIG. 4 allows the UE to select one specific EAB information update/acquisition scheme by comparing a DRX cycle given to the UE and a DRX cycle threshold. In S430, the UE compares the DRX cycle and the DRX cycle threshold and performs a subsequent EAB information update/acquisition scheme based on the comparison.

If the DRX cycle is greater than the DRX cyclic threshold, the UE receives the 1st SIB to determine whether the EAB information has been changed and further receives the 2nd SIB to obtain changed EAB information when the first SIB indicates the EAB information has been changed. (S440-S450). Namely, it is proposed that the EAB information itself should be included in the $2^{nd}$ SIB, and the 1st SIB only include EAB change notification (i.e., an indicator indicating whether the EAB information has been updated). The 1st SIB can be a conventional SIB, i.e., SIB type 1, and the $2^{nd}$ SIB can be a newly-designed SIB of which transmission period is greater than any of conventional SIBs.

Further, the EAB change notification can be implemented as a value tag included in the SIB type 1. The value tag in the SIB type 1 can be increased every time relevant information has been updated, thereby informing of UEs that relevant information should be further obtained by UEs.

If the DRX cycle is not greater than the DRX cyclic threshold, the UE receives a paging message to determine whether the EAB information has been changed and further receives the 2nd SIB to obtain changed EAB information when the paging message indicates the EAB information has been changed. (S460-S470). Namely, it is proposed that the EAB information itself should be included in the $2^{nd}$ SIB and the paging message only include EAB change notification.

In S480, the UE performs the EAB operation by using information obtained through Steps S440-450 or Steps $460-470.

Figure 5:
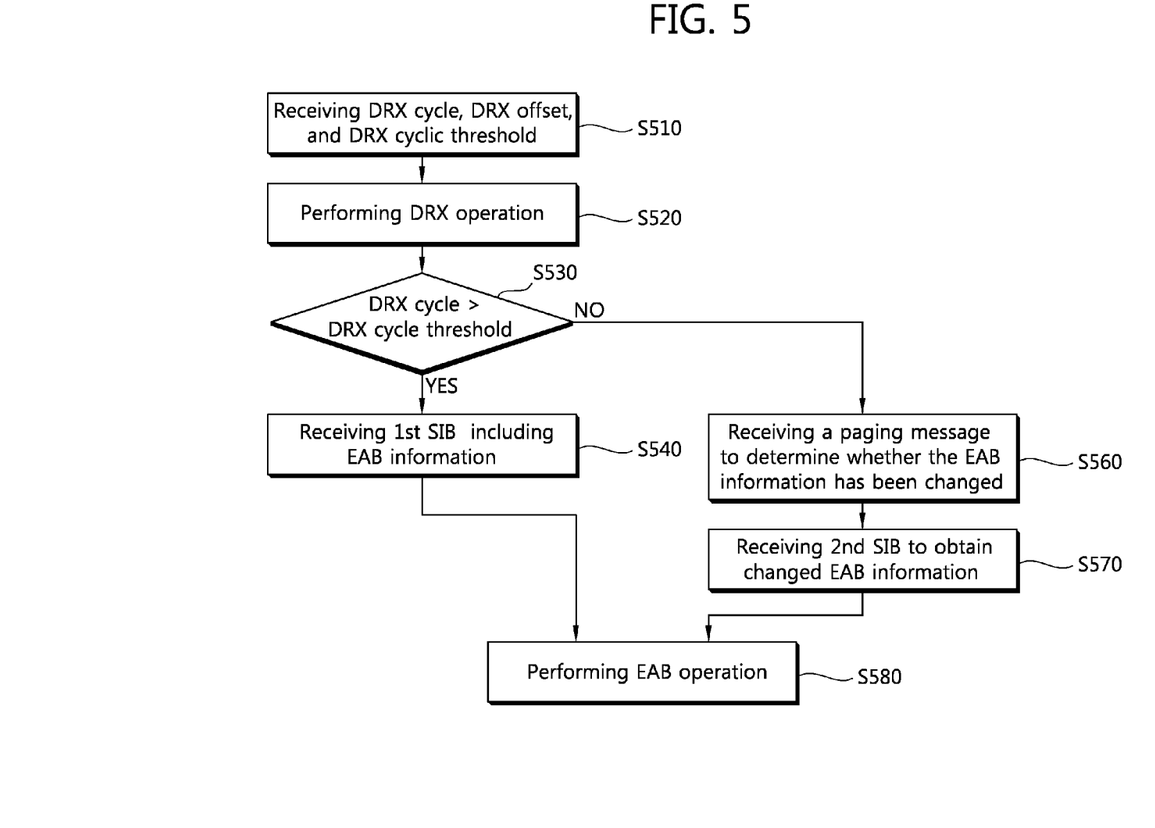
FIG. 5 is another flow chart using a DRX threshold proposed by the present description.

FIG. 5 is another flow diagram proposed by the present description. The example of FIG. 5 also uses the DRX cycle threshold to determine which EAB information update/acquisition scheme is applied.

In S510, the UE configured with the EAB receives control information related to DRX operation. In S520, each UE performs a DRX operation based on the received information. In S530, the UE compares the DRX cycle and the DRX cycle threshold and performs a subsequent EAB information update/acquisition scheme based on the comparison.

If the DRX cycle is greater than the DRX cyclic threshold, the UE receives the 1st SIB to obtain changed EAB information. (S540). The $1^{st}$ SIB can be a newly-design SIB of which transmission period is greater than any of conventional SIBs.

If the DRX cycle is not greater than the DRX cyclic threshold, the UE receives a paging message to determine whether the EAB information has been changed and further receives the 2nd SIB to obtain changed EAB information when the paging message indicates the EAB information has been changed. (S560-S570).

In S580, the UE performs EAB operation by using information obtained through Step S540 or Steps S560-570.

The present description proposes an additional example of improving performance of the above-explained alternatives (e.g., alternative f). In detail, the present description proposes an extended backoff operation, which is used for a surge event. The surge event can be associated with abnormal situation causing the surge (i.e., extreme increase) of radio access attempts. Examples of the surge event include power outage, disaster, abnormal power outage report, and alarm report.

The surge event can be associated with uplink operation, since such event is caused by users or UEs. Thus, if uplink traffic to be transmitted from UEs is associated with the surge event, the proposed mechanism using the extended backoff operation can be used. In detail, if the UE determines that such uplink traffic is associated with the surge event, the UE performs the EAB operation and thereafter performs the extended backoff operation. Otherwise the UE performs the EAB operation and thereafter performs a normal backoff operation, as opposed to the extended backoff operation.

The extended or normal backoff operation is performed before transmitting an initial random access preamble, which is also referred to as Message 1. The backoff operation (extended or normal backoff) can be associated with a backoff value indicating an upper bound/limit of the backoff duration. Once the backoff value is given, the UE may randomly select a backoff duration from a range of [0, upper bound]. Thereafter, the UE delays the initial random access preamble transmission during the selected backoff duration.

Since the extended backoff is applied to the surge event, which has a relatively higher congestion level, it is preferred that the upper bound of the extended backoff should be higher/greater than that of the normal backoff.

As discussed above, the EAB operation is also performed together with the normal/extended backoff. Therefore, the EAB information is delivered to the UE via various signalling (e.g., SIB), then the UE uses extended backoff parameter(s) or normal backoff parameter(s) after checking Extended Access Barring for random access. Access load from UEs configured with EAB (e.g., MTC devices) can be efficiently controlled for both normal traffic via EAB and abnormal traffic via EAB combined with extended backoff.

If the EAB and ACB are sequentially performed, the UE experiencing the surge event (e.g., abnormal power outage report) performs the extended backoff operation before transmitting initial random access preamble as well as before retransmitting random access preamble after checking EAB and ACB (i.e., when neither EAB nor ACB bar the UE's access). Further, UE experiencing the normal event performs the normal backoff operation using backoff parameter before transmitting initial random access preamble as well as before retransmitting random access preamble after checking EAB and ACB (i.e., when neither EAB nor ACB bar the UE's access).

Figure 6:
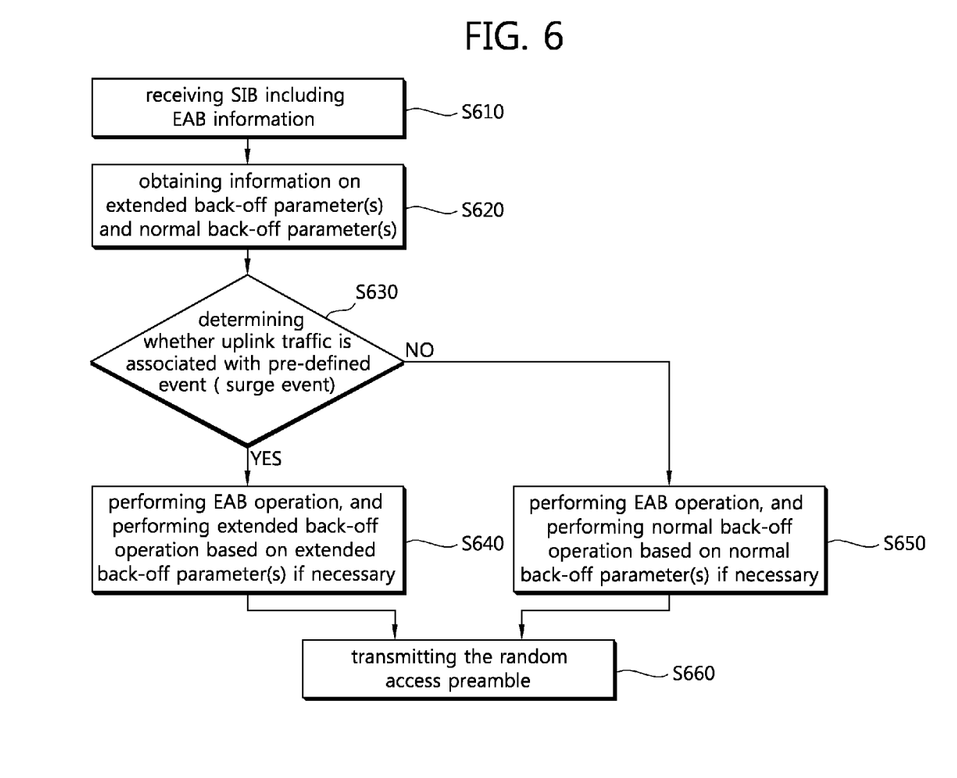
FIG. 6 is a flow diagram using different backoff operations proposed by the present description.

FIG. 6 is a flow diagram proposed by the present description. To perform the EAB operation with the extended or normal backoff operation, the UE receives SIB including the EAB information (S610). Further, the UE obtains information on extended back-off parameter(s) and normal back-off parameter(s) (S620). The extended back-off parameter(s) and normal back-off parameter(s) can be obtained in various ways. For instance, the normal backoff parameter(s) and/or extended backoff parameter(s) can be included in the SIB including EAB information. Further, the normal backoff parameter(s) and/or extended backoff parameter(s) can be pre-configured to UE based on UE's access class (e.g., EAB configured UE). The value of the extended backoff parameter(s) can be different depending on UE's access class. Further, the extended backoff operation can be applied only to UEs configured with EAB.

Once the uplink traffic is ready to be transmitted, the UE determines whether such traffic is associated with a pre-defined event, i.e., surge event. For instance, in case to where the uplink traffic is generated for alarm report (e.g., abnormal power outage report), such traffic can be determined to be associated with the surge event (S630). In such case, the UE configured with EAB can attempt to establish connection with the network by checking and performing the EAB operation if necessary (S640). Further, the aforementioned extended backoff operation is further performed if necessary (S640).

In case where the uplink traffic is not associated with the surge event, the UE checks and performs the EAB and the normal backoff operation (S650).

Once the EAB and backoff operations are completed, the UE can perform a subsequent RA process (e.g., RA preamble transmission) (S660).

In addition, the power outage alarm report can be configured as the delay tolerant traffic to control the access load via extended backoff method, since such alarm report can be delayed due the operation of the extended backoff. It should be noted that while the EAB is not applicable to emergency service, the extended backoff in addition to EAB operation can be applied to specific delay tolerant traffic such as the power outage report.

Figure 7:
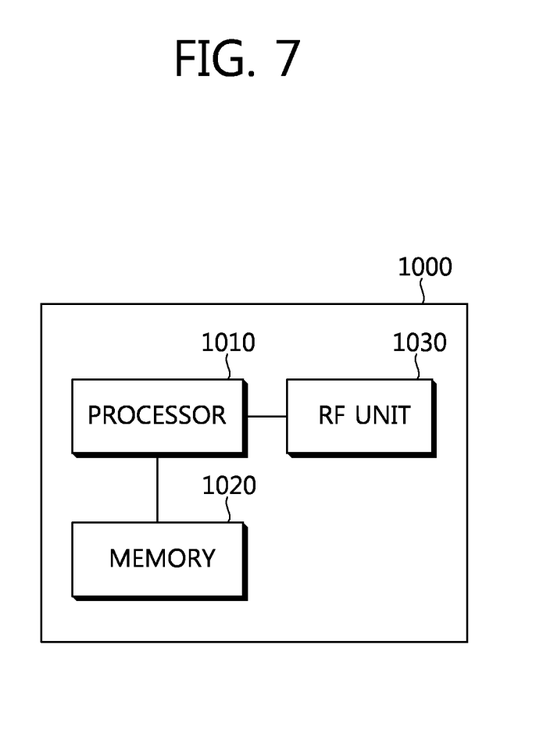
FIG. 7 is a block diagram showing a wireless apparatus to implement technical features of this description.

FIG. 7 is a block diagram showing a wireless apparatus to implement technical features of this description. This may be a part of a UE, an eNodeB/HeNodeB/HNodeB, or a core network (CN) entity. The wireless apparatus 1000 may include a processor 1010, a memory 1020 and a radio frequency (RF) unit 1030.

The processor 1010 may be configured to implement proposed functions, procedures and/or methods described in this description. Layers of the radio interface protocol may be implemented in the processor 1010. The processor 1010 may handle a procedure explained above. The memory 1020 is operatively coupled with the processor 1010, and the RF unit 1030 is operatively coupled with the processor 1010.

The processor 1010 may include application-specific integrated circuit (ASIC), other chipset, logic circuit and/or data processing device. The memory 1020 may include read-only memory (ROM), random access memory (RAM), flash memory, memory card, storage medium and/or other storage device. The RF unit 1030 may include baseband circuitry to process radio frequency signals. When the embodiments are implemented in software, the techniques described herein can be implemented with modules (e.g., procedures, functions, and so on) that perform the functions described herein. The modules can be stored in memory 1020 and executed by processor 1010. The memory 1020 can be implemented within the processor 1010 or external to the processor 1010 in which case those can be communicatively coupled to the processor 1010 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the appended claims.

What is claimed is:

1. A method of performing random access based on Extended Access class Barring (EAB) information for a user equipment (UE) in a wireless communication system using a number of orthogonal frequency division multiple (OFDM) symbols, the method performed by the UE and comprising:
   receiving Discontinuous Reception (DRX) information on a DRX cycle and a DRX offset from a base station (BS);
   performing a DRX operation based on the DRX information;
   determining whether the DRX cycle indicated by the DRX information is greater than a DRX cyclic threshold, wherein the DRX cyclic threshold is included in control information received from the BS;
   if the DRX cycle is greater than the DRX cyclic threshold, receiving a first system information block (SIB) to determine whether the EAB information has been changed and further receiving a second SIB to obtain changed EAB information when the first SIB indicates the EAB information has been changed;
   if the DRX cycle is not greater than the DRX cyclic threshold, receiving a paging message from the BS to determine whether the EAB information has been changed and further receiving the second SIB to obtain changed EAB information when the paging message indicates the EAB information has been changed; and
   performing an EAB operation based on the changed EAB information.

2. The method of claim 1, wherein the DRX cycle and the DRX offset are UE specific, and the DRX cyclic threshold is common to all UEs in a same cell.

3. The method of claim 1, wherein the first SIB is a SIB type 1, wherein the UE determines whether the EAB information has been changed by decoding a value tag included in the SIB type 1.

4. The method of claim 1, wherein the DRX cycle includes an on-duration during which the UE monitors a physical control channel and an off-duration during which the UE stops monitoring the physical control channel.

5. The method of claim 1, wherein UE is a machine type communication (MTC) device.

6. The method of claim 1, wherein the first SIB does not include the EAB information.

7. The method of claim 1, wherein the EAB information includes n bits, each indicating whether a corresponding access class is barred.

8. A method of performing random access based on Extended Access class Barring (EAB) information for a user equipment (UE) in a wireless communication system using a number of orthogonal frequency division multiple (OFDM) symbols, the method performed by the UE and comprising:
   receiving Discontinuous Reception (DRX) information on a DRX cycle and a DRX offset from a base station (BS);
   performing a DRX operation based on the DRX information;
   determining whether the DRX cycle indicated by the DRX information is greater than a DRX cyclic threshold, wherein the DRX cyclic threshold is included in control information received from the BS;
   if the DRX cycle is greater than the DRX cyclic threshold, receiving a system information block (SIB) including the EAB information;
   if the DRX cycle is not greater than the DRX cyclic threshold, receiving a paging message from the BS to determine whether the EAB information has been changed and further receiving the SIB to obtain changed EAB information when the paging message indicates the EAB information has been changed; and performing an EAB operation based on the changed EAB information.

9. The method of claim 8, wherein the DRX cycle and the DRX offset are UE specific, and the DRX cyclic threshold is common to all UEs in a same cell.

10. The method of claim 8, wherein the DRX cycle includes an on-duration during which the UE monitors a physical control channel and an off-duration during which the UE stops monitoring the physical control channel.

11. The method of claim 8, wherein UE is a machine type communication (MTC) device.

12. A method of performing random access based on Extended Access class Barring (EAB) information for a user equipment (UE) in a wireless communication system using a number of orthogonal frequency division multiple (OFDM) symbols, the method performed by the UE and comprising:

receiving a system information block (SIB) including the EAB information from a base station (BS);

obtaining information on an extended back-off parameter and a normal back-off parameter;

determining whether uplink traffic to be transmitted from the UE to the BS is associated with a pre-defined event, wherein the pre-defined event is associated with a surge event;

if the uplink traffic is associated with the pre-defined event, performing an EAB operation, and determining whether to perform a first type back-off operation based on the extended back-off parameter before transmitting a random access preamble to the BS; and if the uplink traffic is not associated with the pre-defined event, performing an EAB operation, and determining whether to perform a second type back-off operation based on the normal back-off parameter before transmitting the random access preamble to the BS, wherein the extended back-off parameter indicates an upper bound of a back-off time of the first type back-off operation, wherein the normal back-off parameter indicates an upper bound of a back-off time of the second type back-off operation.

13. The method of claim 12, wherein the surge event includes power outage event or disaster event.

14. The method of claim 12, wherein the extended back-off parameter and the normal back-off are included in a system information block (SIB).

\* \* \* \* \*